United States Patent
Kagata et al.

(10) Patent No.: US 12,134,700 B2
(45) Date of Patent: Nov. 5, 2024

(54) DYE PRINTING TREATMENT LIQUID COMPOSITION, COMPOSITION SET, PRINTING METHOD, AND INK JET PRINTING METHOD

(71) Applicant: SEIKO EPSON CORPORATION, Tokyo (JP)

(72) Inventors: Takayoshi Kagata, Shiojiri (JP); Ryota Miyasa, Matsumoto (JP); Toshiaki Oguchi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 81 days.

(21) Appl. No.: 18/169,503

(22) Filed: Feb. 15, 2023

(65) Prior Publication Data
US 2023/0257589 A1    Aug. 17, 2023

(30) Foreign Application Priority Data
Feb. 16, 2022 (JP) .................. 2022-022431

(51) Int. Cl.
| | |
|---|---|
| C09B 67/00 | (2006.01) |
| B41J 2/145 | (2006.01) |
| C09B 67/44 | (2006.01) |
| C09B 69/06 | (2006.01) |
| D06P 5/00 | (2006.01) |
| D06P 5/30 | (2006.01) |
| B41J 2/01 | (2006.01) |

(52) U.S. Cl.
CPC .............. C09B 69/06 (2013.01); B41J 2/145 (2013.01); C09B 67/0083 (2013.01); D06P 5/30 (2013.01); B41J 2002/012 (2013.01)

(58) Field of Classification Search
CPC ...... C09B 69/06; C09B 67/0083; B41J 2/145; B41J 2002/012; D06P 5/30; D06P 1/16; D06P 1/5271; D06P 5/002; D06P 5/003; D06P 5/005; D06P 5/22; C08G 63/672
USPC ......................................... 8/445
See application file for complete search history.

(56) References Cited

U.S. PATENT DOCUMENTS 4,215,992 A * 8/1980 Sato ................ D06P 1/613
                                                8/445
4,576,610 A * 3/1986 Donenfeld ......... D06P 5/004
                                                8/918

(Continued)

FOREIGN PATENT DOCUMENTS

| JP | 2006036648 A * | 2/2006 | ........... C07D 311/96 |
| JP | 2009-249773 A | 10/2009 | |
| JP | 6242269 B2 * | 12/2017 | ............. C08G 63/99 |

*Primary Examiner* — Eisa B Elhilo
(74) *Attorney, Agent, or Firm* — Harness, Dickey & Pierce, P.L.C.

(57) ABSTRACT

A dye printing treatment liquid composition is used to be adhered to a cloth and includes a polyester resin and water, the polyester resin includes a structural unit derived from an aromatic compound and a structural unit derived from a non-aromatic compound, the aromatic compound includes a phthalic acid, the non-aromatic compound includes a (poly) alkylene glycol, a content of a structural unit derived from the phthalic acid with respect to 100 percent by mole of the polyester resin is 15 to 85 percent by mole, and a content of a structural unit derived from the (poly)alkylene glycol with respect to 100 percent by mole of the polyester resin is 15 to 85 percent by mole.

12 Claims, 1 Drawing Sheet

(56) References Cited

U.S. PATENT DOCUMENTS 6,656,228 B1 * 12/2003 Sherwin .................... D06P 5/30
  8/188
2021/0363691 A1 * 11/2021 Nito ..................... C09D 11/324

* cited by examiner

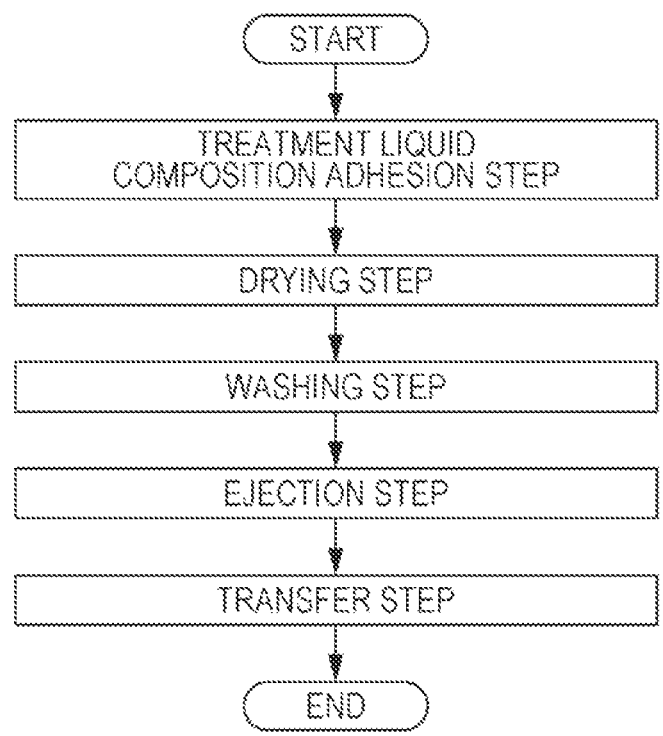

DYE PRINTING TREATMENT LIQUID COMPOSITION, COMPOSITION SET, PRINTING METHOD, AND INK JET PRINTING METHOD

The present application is based on, and claims priority from JP Application Serial Number 2022-022431, filed Feb. 16, 2022, the disclosure of which is hereby incorporated by reference herein in its entirety.

BACKGROUND

1. Technical Field

The present disclosure relates to a dye printing treatment liquid composition, a composition set, a printing method, and an ink jet printing method.

2. Related Art

Heretofore, there has been known a technique in which when a printed matter is manufactured by dyeing a cloth with a colorant, in order to improve a color development property and a fastness of the colorant, a pre-treatment is performed on the cloth using a treatment liquid. As the technique as described above, for example, a technique disclosed in JP-A-2009-249773 in which a pre-treatment liquid formed from a water-based composition is adhered to a polyester cloth has been known.

However, in the pre-treatment liquid disclosed in JP-A-2009-249773, there has been a problem in that a printed matter having an excellent color development property and a preferable texture is difficult to obtain. In the first place, JP-A-2009-249773 has disclosed a technique to be performed on a polyester cloth, and printing to be performed on a cloth formed from natural fibers has not been described. Unlike the cloth formed from natural fibers, a polyester cloth can be printed with a dye even if a pre-treatment liquid is not used.

SUMMARY

According to one aspect of the present disclosure, there is provided a dye printing treatment liquid composition which is used to be adhered to a cloth and which comprises a polyester resin and water, and in the treatment liquid composition described above, the polyester resin includes a structural unit derived from an aromatic compound and a structural unit derived from a non-aromatic compound, the aromatic compound includes a phthalic acid, the non-aromatic compound includes a (poly)alkylene glycol, a content of a structural unit derived from the phthalic acid with respect to 100 percent by mole of the polyester resin is 15 to 85 percent by mole, and a content of a structural unit derived from the (poly)alkylene glycol with respect to 100 percent by mole of the polyester resin is 15 to 85 percent by mole.

BRIEF DESCRIPTION OF THE DRAWING

FIGURE is a flowchart showing one example of an indirect printing recording method of this embodiment.

DESCRIPTION OF EXEMPLARY EMBODIMENTS

Hereinafter, although an embodiment (hereinafter, referred to as "this embodiment") of the present disclosure will be described in detail, the present disclosure is not limited thereto and may be variously changed and/or modified without departing from the scope of the present disclosure.

1. Dye Printing Treatment Liquid Composition

A dye printing treatment liquid composition (hereinafter, referred to as "treatment liquid composition" in some cases) of this embodiment is a treatment liquid composition which is used to be adhered to a cloth and which contains a polyester resin and water, the polyester resin includes a structural unit derived from an aromatic compound and a structural unit derived from a non-aromatic compound, the aromatic compound includes a phthalic acid, the non-aromatic compound includes a (poly)alkylene glycol, a content of a structural unit derived from the phthalic acid with respect to 100 percent by mole of the polyester resin is 15 to 85 percent by mole, and a content of a structural unit derived from the (poly)alkylene glycol with respect to 100 percent by mole of the polyester resin is 15 to 85 percent by mole. Before dye printing is performed, the treatment liquid composition is preferably used to be adhered to the cloth.

According to this embodiment, since the treatment liquid composition is adhered to the cloth in advance, and dye printing is performed on the cloth to which the treatment liquid composition is adhered, a printed matter having an excellent color development property and a preferable texture can be obtained.

Although the reason the excellent effect as described above can be obtained in this embodiment is not clearly understood, the present inventors believe as described below.

That is, in general, an ink containing a dispersive dye or the like to be used for printing has a low affinity to a cloth containing fibers such as cotton and is not likely to be dye-printed thereon. On the other hand, an ink containing a dispersive dye or the like is likely to be dyed on a polyester resin, primarily, because of non-covalent bonds, such as a π-π interaction and a van der Waals force, with a structural unit derived from an aromatic compound in the polyester resin. In addition, since having a high affinity to a cloth containing fibers, a polyester resin is able to exist on the cloth. Hence, when a polyester resin is adhered to the cloth using a treatment liquid composition, a dyeability of an ink containing a dispersive dye or the like can also be imparted to the cloth containing fibers such as cotton.

However, since the structural unit derived from an aromatic compound in the polyester resin forms a rigid structure, when a polyester resin having a high content of the structural unit derived from an aromatic compound is used, a printed matter to be obtained tends to be inferior in terms of texture. On the other hand, when a polyester resin having a low content of the structural unit derived from an aromatic compound is used, the ink is not likely to be dyed on the polyester resin, and as a result, the color development property tends to be made inferior.

On the other hand, the treatment liquid composition of this embodiment contains a polyester resin which includes a structural unit derived from an aromatic compound and a structural unit derived from a non-aromatic compound and in which the aromatic compound includes a phthalic acid, the non-aromatic compound includes a (poly)alkylene glycol, and a content of a structural unit of the phthalic acid and a content of a structural unit of the (poly)alkylene glycol are respective specific values. Because of the structural unit derived from the phthalic acid and the structural unit derived from the (poly)alkylene glycol, this polyester resin has an adequate flexibility, and primarily because of the structural unit derived from the phthalic acid which is an aromatic compound, this polyester resin also has an excellent dye-affinity to the ink. Hence, it is believed that when this polyester resin is adhered to the cloth, a printed matter having an excellent color development property and a preferable texture can be obtained. However, the reason is not limited thereto.

Next, the components contained in the treatment liquid composition will be described, and the cloth will be described later.

1.1. Polyester Resin

The treatment liquid composition contains a polyester resin. The polyester resin includes a structural unit derived from an aromatic compound and a structural unit derived from a non-aromatic compound, the aromatic compound includes a phthalic acid, the non-aromatic compound includes a (poly)alkylene glycol, a content of a structural unit derived from the phthalic acid with respect to 100 percent by mole of the polyester resin is 15 to 85 percent by mole, and a content of a structural unit derived from the (poly)alkylene glycol with respect to 100 percent by mole of the polyester resin is 15 to 85 percent by mole.

Since the treatment liquid composition contains the polyester resin as described above, a printed matter having an excellent color development property and a preferable texture can be obtained.

In addition, in this specification, the "structural unit derived from a phthalic acid" is assumed to include in the polyester resin, besides a structural unit derived from polymerization using a phthalic acid, a structural unit formed by a reaction or the like which is able to provide a structural unit similar to that described above. In addition, the "structural unit derived from a (poly)alkylene glycol" is also assumed to be understood in a manner similar to that described above.

The polyester resin contains, as the structural unit derived from an aromatic compound, a specific amount of the structural unit derived from a phthalic acid. In this specification, the phthalic acid is assumed to include orthophthalic acid, isophthalic acid, and terephthalic acid. In addition, the phthalic acid may have a substituent or may be in the form of a salt. As the salt, for example, a potassium salt or a sodium salt may be mentioned.

Since a printed matter having a more excellent color development property and a preferable texture tends to be obtained, the content of the structural unit derived from a phthalic acid with respect to 100 percent by mole of the polyester resin is preferably 20 to 80 percent by mole.

As the phthalic acid, for example, there may be mentioned an alkyl phthalic acid, such as orthophthalic acid, isophthalic acid, terephthalic acid, methylorthophthalic acid, methylisophthalic acid, or methylterephthalic acid; a hydroxyphthalic acid, such as hydroxyorthophthalic acid, hydroxyisophthalic acid, or hydroxyterephthalic acid; an aminophthalic acid, such as aminoorthophthalic acid, aminoisophthalic acid, or aminoterephthalic acid; a nitrophthalic acid, such as nitroorthophthalic acid, nitroisophthalic acid, or nitroterephthalic acid; a sulfophthalic acid, such as sulfoorthophthalic acid, sulfoisophthalic acid, or sulfoterephthalic acid; or a salt of at least one of those mentioned above. The phthalic acid may be used alone, or at least two types thereof may be used in combination.

Since a printed matter having, besides a more excellent color development property and a more preferable texture, excellent abrasion resistance and washing fastness tends to be obtained, as the phthalic acid, at least one selected from the group consisting of orthophthalic acid, isophthalic acid, and terephthalic acid is preferable, and at least one selected from the group consisting of isophthalic acid and terephthalic acid is more preferable.

Since a printed matter having, besides more excellent texture, abrasion resistance, and washing fastness, more excellent color development property and discoloration resistance tends to be obtained, as the phthalic acid, terephthalic acid and isophthalic acid are more preferably contained. In the case described above, a molar ratio of a content of a structural unit derived from isophthalic acid with respect to a content of a structural unit derived from terephthalic acid is preferably 0.5 to 3.0. Furthermore, since a printed matter having, besides preferable texture, abrasion resistance, washing fastness, and discoloration resistance, an even more excellent color development property tends to be obtained, the molar ratio of the content of the structural unit of isophthalic acid with respect to the content of the structural unit derived from terephthalic acid is preferably 2.0 to 2.5.

When the molar ratio of the content of the structural unit derived from isophthalic acid with respect to the content of the structural unit derived from terephthalic acid is in the range described above, although the reason a printed matter having, besides more preferable texture, abrasion resistance, and washing fastness, more excellent color development property and discoloration resistance tends to be obtained is not clearly understood, the present inventors believe as described below. That is, when the molar ratio is in the range described above, a polymer chain in the polyester resin has an appropriately bent structure. Accordingly, the ink containing a dispersive dye or the like is likely to be incorporated in the polymer chain, and hence, the dye-affinity of the polyester resin is made more preferable, and as a result, it is believed that a printed matter having, besides more preferable texture, abrasion resistance, and washing fastness, more excellent color development property and discoloration resistance tends to be obtained. However, the reason is not limited thereto.

The polyester resin contains, as the structural unit derived from a non-aromatic compound, a specific amount of the structural unit derived from a (poly)alkylene glycol. In this specification, since the (poly)alkylene glycol is a non-aromatic compound, although a skeleton of the (poly)alkylene glycol includes an alkylene group, the (poly)alkylene glycol may also include at least one type of bond selected from the group consisting of an ether bond and an ester bond in its skeleton. In addition, in this specification, the (poly)alkylene glycol indicates both an alkylene glycol having one alkylene glycol in its structure and a polyalkylene glycol having at least two alkylene groups in its structure. The alkylene group may have any one of a linear, a branched, and an alicyclic structure.

Since a printed matter having more excellent color development property and discoloration resistance and a more preferable texture tends to be obtained, a content of the structural unit derived from a (poly)alkylene glycol with respect to 100 percent by mole of the polyester resin is preferably 20 to 80 percent by mole.

Since a printed matter having more excellent color development property and discoloration resistance and a more preferable texture tends to be obtained, as the (poly)alkylene glycol, a linear or branched (poly)alkylene glycol having 2 to 20 carbon atoms is preferable, and a linear or branched (poly)alkylene glycol having 2 to 10 carbon atoms is more preferable.

As the alkylene glycol, for example, there may be mentioned ethylene glycol, diethylene glycol, triethylene glycol, tetraethylene glycol, dipropylene glycol, 1,2-propylene glycol, 1,3-propane diol, tripropylene glycol, tetrapropylene glycol, hexamethylene glycol, tetramethylene glycol, neopentyl glycol, 1,2-butanediol, 1,3-butanediol, 1,4-butanediol, 1,2-pentanediol, 1,5-pentanediol, 1,2-hexanediol, 1,6-hexanediol, 3-methyl-1,5-pentanediol, 1,2-cyclohexanediol, 1,4-cyclohexanediol, 1,4-cyclohexanedimethanol, glycerin, trimethylolethane, trimethylolpropane, 1,2,5-hexanetriol, 1,2,6-hexanetriol, pentaerythritol, trimethylolmelamine, dimethyl-1,3-pentanediol, diethyl-1,3-pentanediol, dipropyl-1,3-pentanediol, dibutyl-1,3-pentanediol, 2-butyl-2-ethyl-1,3-propanediol, tricyclodecanedimethanol, pentacyclodecanedimethanol, 1,3-adamantanediol, 2,2-adamantanediol, a polyethylene glycol, a polypropylene glycol, a polytetramethylene glycol, or a polytetramethyleneoxide glycol. The (poly)alkylene glycol may be used alone, or at least two types thereof may be used in combination.

Furthermore, since a printed matter having excellent color development property and discoloration resistance and a more preferable texture tends to be obtained, as the (poly) alkylene glycol, at least one selected from the group consisting of ethylene glycol, neopentyl glycol, and diethylene glycol is preferable, and at least one selected from the group consisting of ethylene glycol and neopentyl glycol is more preferable.

As long as the effect of the present disclosure can be obtained, the polyester resin may also contain, as the structural unit, an aromatic compound other than the phthalic acid and a non-aromatic compound other than the (poly)alkylene glycol.

As the compound as described above, for example, there may be mentioned a polyvalent carboxylic acid, such as 4,4'-diphenyl dicarboxylic acid, 2,5-naphthalene dicarboxylic acid, 1,5-naphthalene dicarboxylic acid, 2,6-naphthalene dicarboxylic acid, 2,7-naphthalene dicarboxylic acid, 1,4-cyclohexane dicarboxylic acid, adipic acid, azelaic acid, sebacic acid, dodecane dicarboxylic acid, glutaric acid, succinic acid, trimellitic acid, trimesic acid, pyromellitic acid, trimellitic anhydride, phthalic anhydride, succinic anhydride, or p-hydroxybenzoic acid, or a salt of at least one of those mentioned above; or a polyvalent alcohol, such as p-xylylene glycol, a bisphenol A-ethylene glycol adduct, dimethylol propionic acid, or dimethylol ethyl sulfonic acid, or a salt of at least one of those mentioned above. As the salt, for example, a potassium salt, a sodium salt, a calcium salt, or a magnesium salt may be mentioned. Those compounds may be used alone, or at least two types thereof may be used in combination.

The polyester resin may include a hydroxy group, a carboxy group, or a sulfonic acid group, or a sodium salt of at least one of those mentioned above. At least one of those groups may be included in the polyester resin.

A sulfonic acid group-containing polyester resin includes, for example, the structural unit derived from a phthalic acid, the structural unit derived from a (poly)alkylene glycol, and a structural unit derived from a sulfonic acid group-containing aromatic monomer.

As the sulfonic acid group-containing aromatic monomer, for example, there may be mentioned 5-sulfoisophthalic acid, sulfoterephthalic acid, 4-sulfophthalic acid, 4-sulfonaphthalene-2,7-dicarboxylic acid, or 4-sulfo-1,8-naphthalenedicarboxylic anhydride, or a salt of at least one of those mentioned above. As the salt, the salts described above may be mentioned as reference, and a sodium salt is preferable.

Since including at least one of the groups mentioned above, the polyester resin is able to preferably react with the following cross-linking agent, and as a result, an adhesion between the polyester resin and the cloth or a cloth containing fibers which preferably have a hydroxy group is made preferable. Hence, a printed matter having, besides more excellent color development property and texture, excellent abrasion resistance, washing fastness, and discoloration resistance can be obtained.

Since a printed matter having an excellent color development property, a preferable texture, and a more excellent discoloration resistance tends to be obtained, the polyester resin preferably has a glass transition temperature of 50° C. or more. An upper limit of the glass transition temperature is, for example, 180° C. or less and may be 150° C. or less. In this specification, the glass transition temperature of the polyester resin can be measured, for example, using a differential scanning calorimeter (hereinafter, referred to as "DSC" in some cases).

The polyester resin can be obtained by a general synthetic method.

As the method described above, for example, there may be mentioned a method in which after arbitrary amounts of a phthalic acid, a (poly)alkylene glycol, and if needed, compounds other than the phthalic acid and the (poly) alkylene glycol are simultaneously charged, polymerization is performed through an esterification reaction or an ester exchange reaction, followed by a condensation reaction. Although a polymerization temperature is not particularly limited, for example, a range of 180° C. to 290° C. is preferable. For the polymerization, a polymerization catalyst, such as a titanium-based catalyst, a tin-based catalyst, a zinc acetate catalyst, an antimony trioxide catalyst, or a germanium dioxide catalyst, may be used. As for a concrete synthetic method, a method described in Example may be mentioned as reference.

The polyester resin may be used alone, or at least two types thereof may be used in combination.

Since a printed matter having more excellent color development property, texture, discoloration resistance, abrasion resistance, and washing fastness tends to be obtained, a content of the polyester resin with respect to a total mass of the treatment liquid composition is preferably 0.05 to 20 percent by mass on a solid content basis. Since a printed matter having, besides more excellent texture, abrasion resistance, discoloration resistance, and washing fastness, an even more excellent color development property tends to be obtained, the content of the polyester resin with respect to the total mass of the treatment liquid composition is, on a solid content basis, preferably 2 to 15 percent by mass and more preferably 3 to 10 percent by mass.

1.2. Cross-Linking Agent

The treatment liquid composition preferably further contains a cross-linking agent.

Since the cross-linking agent is contained in the treatment liquid composition, a cross-linking property can be imparted to the treatment liquid composition, and the polyester resin, the dye, and the cloth can be bonded to each other. Hence, a printed matter having, besides a preferable texture, excellent color development property and abrasion resistance and also having excellent washing fastness and discoloration resistance tends to be obtained.

The cross-linking agent may be used after being appropriately selected from known cross-linking agents, and either a cross-linking agent to start a cross-linking reaction at ordinary temperature or a cross-linking agent to start a cross-linking reaction by heat may be used. As the cross-linking agent described above, for example, there may be mentioned a cross-linking agent having a self cross-linking property, a compound having a plurality of functional groups in its molecule to react with an unsaturated carboxylic acid component, or a metal having a polyvalent coordination site.

Since a printed matter having, besides a preferable texture, excellent color development property and also having more excellent abrasion resistance, washing fastness, and discoloration resistance further tends to be obtained, as the cross-linking agent, for example, a compound including an isocyanate group and/or an oxazoline group is preferable, and an isocyanate group is more preferably included.

As an isocyanate group-containing cross-linking agent, for example, a water dispersive type (block)polyisocyanate may be mentioned. In addition, the (block)polyisocyanate indicates a polyisocyanate and/or a block polyisocyanate. Those isocyanate group-containing cross-linking agents maybe used alone, or at least two types thereof may be used in combination.

As a water dispersive type polyisocyanate, for example, there may be mentioned a polyisocyanate which has a hydrophilic property imparted by a polyethylene oxide chain and which is dispersed in water by an anionic dispersant or a nonionic dispersant.

As the polyisocyanate, for example, there may be mentioned a diisocyanate, such as hexamethylene diisocyanate or isophoronediisocyanate; or a polyisocyanate derivative (modified compound), such as a trimethylolpropane adduct, a burette form, or an isocyanurate form, of the diisocyanate mentioned above. In addition, the polyisocyanate may have an isocyanurate skeleton in its structure. Those polyisocyanates may be used alone, or at least two types thereof may be used in combination.

The water dispersive type block polyisocyanate is a compound in which an isocyanate group of the water dispersive type polyisocyanate is blocked with a blocking agent. As the blocking agent, for example, there may be mentioned diethyl malonate, ethyl acetoacetate, ε-caprolactam, butanone oxime, cyclohexanone oxime, 1,2,4-triazole, dimethyl-1,2,4-triazole, 3,5-dimethyl pyrazole, or imidazole. Those blocking agents may be used alone, or at least two types thereof may be used in combination.

As the cross-linking agent, an isocyanate group-containing cross-linking agent having an isocyanurate skeleton in its structure is preferable, and a water dispersive type polyisocyanate having an isocyanurate skeleton in its structure is more preferable. Since the isocyanate group-containing cross-linking agent having an isocyanurate skeleton has at least three cross-linking points, the adhesion between the polyester resin and the cloth tends to be made more preferable. Hence, a printed matter having, besides a preferable texture, more excellent color development property and abrasion resistance and also having excellent washing fastness and discoloration resistance tends to be obtained.

As the isocyanate group-containing cross-linking agent described above, a commercially available product may also be used. As the commercially available product, for example, there may be mentioned Fixer #100ECO, #104EA, #220, 70ECO, #70, #410, or #400 (trade name, manufactured by Murayama Chemical Laboratory Co., Ltd.); or Elastron (registered trademark) BN-11, BN-27, BN-69, or BN-77 (trade name, manufactured by DKS Co., Ltd.).

As the oxazoline group-containing cross-linking agent, for example, a compound having at least two oxazoline groups in its molecule may be mentioned. As the oxazoline group-containing compound described above, for example, there may be mentioned 2,2'-bis(2-oxazoline), 2,2'-methylene-bis(2-oxazoline), 2,2'-ethylene-bis(2-oxazoline), 2,2'-trimethylene-bis(2-oxazoline), 2,2'-tetramethylene-bis(2-oxazoline), 2,2'-hexamethylene-bis(2-oxazoline), 2,2'-octamethylene-bis(2-oxazoline), 2,2'-ethylene-bis(4,4'-dimethyl-2-oxazoline), 2,2'-p-phenylene-bis(2-oxazoline), 2,2'-m-phenylene-bis(2-oxazoline), 2,2'-m-phenylene-bis(4,4'-dimethyl-2-oxazoline), bis(2-oxazolinylcyclohexane)sulfide, bis(2-oxazolinylnorbornane)sulfide, or an oxazoline ring-containing polymer. Those oxazoline group-containing compounds may be used alone, or at least two types thereof may be used in combination.

Since the polyester resin, the dye, and the cloth can be more tightly bonded to each other, and a printed matter having, besides a preferable texture, a more excellent color development property and also having more excellent abrasion resistance, washing fastness, and discoloration resistance tends to be obtained, as the oxazoline group-containing compound, a water-soluble oxazoline group-containing compound is preferable.

As the oxazoline group-containing cross-linking agent described above, a commercially available product may also be used. As the commercially available product, for example, Epocros (registered trademark) K-2010, K-2020, K-2030, K-2035E, WS-300, WS-500, or WS-700 (trade name, manufactured by Nippon Shokubai Co., Ltd.) may be mentioned.

The cross-linking agent may be used alone, or at least two types thereof may be used in combination.

Since a printed matter having, besides a preferable texture, an excellent color development property and also having more excellent abrasion resistance, washing fastness, and discoloration resistance tends to be obtained, a content of the cross-linking agent with respect to the total mass of the treatment liquid composition is preferably 0.1 to 10.0 percent by mass on a solid content basis.

1.3. Water

The treatment liquid composition contains water.

After the treatment liquid composition is adhered to the cloth, the water is evaporated and scattered by drying. As the water, for example, there may be mentioned pure water, such as ion exchange water, ultrafiltration water, reverse osmosis water, or distilled water, or water, such as ultrapure water, in which ionic impurities are removed as much as possible. In addition, when the treatment liquid composition is stored for a long time, since generation of fungi and bacteria can be suppressed, water sterilized by UV radiation, addition of hydrogen peroxide, or the like is preferably used.

A content of the water with respect to the total mass of the treatment liquid composition is preferably 30 to 98 percent by mass, more preferably 35 to 96 percent by mass, and further preferably 40 to 94 percent by mass. Since the content of the water is set in the range described above, while an increase in viscosity of the treatment liquid is suppressed, workability when the treatment liquid is adhered to the cloth and a drying property after the adhesion of the treatment liquid can be improved.

Since a higher affinity and a higher safety can be obtained for the cloth or for a cloth containing fibers which preferably have a hydroxy group, the treatment liquid composition is preferably a water-based treatment liquid composition. In addition, in this embodiment, the "water-based" indicates that the content of the water with respect to the total mass of the composition is 30 percent by mass or more.

1.4. Other Components

The treatment liquid composition may also contain various types of additives, such as a surfactant, a solubilizing agent, a viscosity adjuster, a pH adjuster, an antioxidant, an antiseptic agent, a fungicide, a corrosion inhibitor, and/or a chelating agent.

The additives may be used alone, or at least two types thereof may be used in combination.

A content of each of the additives with respect to the total mass of the treatment liquid composition is, for example, 0.01 to 5.0 percent by mass.

1.5. Preparation Method of Treatment Liquid Composition

The treatment liquid composition may be prepared such that after the components are mixed together in an arbitrary order, impurities, foreign materials, and the like are removed, if needed, by filtration or the like. As a mixing method of the components, there may be used a method in which after the components are sequentially charged in a container equipped with a stirring device, such as a mechanical stirrer or a magnetic stirrer, stirring and mixing are performed. As a filtration method, for example, a centrifugal filtration or a filter filtration may be mentioned.

1.6. Physical Properties of Treatment Liquid Composition

Physical properties of the treatment liquid composition are arbitrarily adjusted by the type of cloth, an adhesion method to the cloth, that is, an application method thereto, and the like. The application method of the treatment liquid composition will be described later.

1.6.1. Viscosity

A viscosity of the treatment liquid composition at 20° C. is preferably set to 1.5 to 100 mPa·s. Since the viscosity of the treatment liquid is set in the range described above, when the treatment liquid is adhered to the cloth, coating properties, such as spreadability, of the treatment liquid can be improved.

In addition, the viscosity of the treatment liquid composition is measured, for example, using a viscoelastic tester MCR-300 (manufactured by Pysica). In particular, after a temperature of the treatment liquid composition is controlled at 20° C., the viscosity thereof can be measured by reading a shear viscosity (mPa·s) at a shear rate of 200 (1/s).

1.6.2. Surface Tension

A surface tension of the treatment liquid composition at 25° C. is preferably set to 30 to 50 mN/m. Since the surface tension of the treatment liquid composition at 25° C. is set in the range described above, appropriate wettability to and permeability in the cloth can be obtained. In addition, since the treatment liquid composition is likely to be uniformly absorbed in the cloth, a difference in adhesion amount to be generated when the treatment liquid composition is applied, that is, generation of coating irregularity, can be suppressed.

In addition, the surface tension of the treatment liquid composition may be measured, for example, using an automatic surface tensiometer CBVP-Z (manufactured by Kyowa Interface Science Co., Ltd.). In particular, in an environment at 25° C., the measurement can be performed in a manner such that a surface tension when a platinum plate is wetted with the treatment liquid composition is read.

2. Ink Jet Ink Composition

An ink jet ink composition (hereinafter, referred to as "ink composition" in some cases) is used to manufacture a printed matter by printing the cloth to which the treatment liquid composition of this embodiment is adhered. Next, the ink composition will be described.

The ink composition according to this embodiment contains a dispersive dye and water.

2.1. Dispersive Dye

Since an excellent color development property can be obtained on the cloth to which the treatment liquid composition is adhered, the ink composition contains a dispersive dye as the dye. The dispersive dye is generally in the form of particles and is a colorant to be dispersed in a dispersion medium by a dispersant. In addition, the dispersive dye is, in general, a nonionic dye having at least one hydrophilic group and at least one appropriate polar group. The dispersive dye may be used alone, or at least two types thereof may be used in combination.

As the dispersive dye, for example, there may be mentioned C.I. Disperse Yellow, C.I. Disperse Red, C.I. Disperse Blue, C.I. Disperse Orange, C.I. Disperse Violet, C.I. Disperse Green, C.I. Disperse Brown, or C.I. Disperse Black.

Among those mentioned above, as the dispersant, a sublimation dye is preferable. In this case, the "sublimation dye" indicates a dye having a sublimation property when being heated.

As the sublimation dye as described above, in particular, for example, there may be mentioned C.I. Disperse Yellow 3, 7, 8, 23, 39, 51, 54, 60, 71, or 86; C.I. Disperse Orange 1, 1:1, 5, 20, 25, 25:1, 33, 56, or 76; C.I. Disperse Brown 2; C.I. Disperse Red 11, 50, 53, 55, 55:1, 59, 60, 65, 70, 75, 93, 146, 158, 190, 190:1, 207, 239, or 240; C.I. Vat Red 41; C.I. Disperse Violet 8, 17, 23, 27, 28, 29, 36, or 57; C.I. Disperse Blue 14, 19, 26, 26:1, 35, 55, 56, 58, 64, 64:1, 72, 72:1, 81, 81:1, 91, 95, 108, 131, 141, 145, or 359; or C.I. Solvent Blue 36, 63, 105, or 111.

In this embodiment, since a more preferable dyeability can be imparted to the cloth to which the treatment liquid composition is adhered, and a printed matter having a sufficient color development property can be obtained, a cyan dye, a red dye, and a yellow dye are preferable. Furthermore, since a preferable dyeability can be imparted to the cloth to which the treatment liquid composition is adhered, and a printed matter having a sufficient color development property can be obtained, C.I. Disperse Blue 359 is more preferable as the cyan dye, C.I. Disperse Red 60 is more preferable as the red dye, and C.I. Disperse Yellow 54 is more preferable as the yellow dye.

In order to more effectively and reliably obtain the operational effect of this embodiment, a content of the colorant with respect to a total mass of the ink composition is preferably 0.05 to 20 percent by mass.

2.2. Water

The ink composition contains water.

As the water, the water contained in the above treatment liquid composition and also described in the preferable embodiment thereof may be mentioned for reference.

In order to more effectively and reliably obtain the operational effect of this embodiment, a content of the water with respect to the total mass of the ink composition is preferably 30 to 80 percent by mass.

2.3. Dispersant

The ink composition may also contain a dispersant.

When the ink composition contains a dispersant, a dispersion property of the dispersive dye is made excellent, and a clogging resistance of the ink composition is made excellent. As the dispersant, for example, a sodium naphthalene sulfonate/formalin condensate or a resin may be mentioned. The sodium naphthalene sulfonate/formalin condensate is a compound obtained by formalin condensation of a sulfonated compound having a naphthalene ring in its molecule or a salt thereof. The dispersant may be used alone, or at least two types thereof may be used in combination.

Since a more preferable dispersion property is obtained, as the dispersant, a resin is preferably contained. As the resin, for example, there may be mentioned an urethane-based resin, a styrene-acrylic-based resin, an acrylic-based resin, a fluorene-based resin, a polyolefin-based resin, a rosin modified resin, a terpene-based resin, a polyester-based resin, a polyamide-based resin, an epoxy-based resin, a vinyl chloride-based resin, a vinyl chloride-vinyl acetate copolymer, or an ethylene-vinyl acetate-based resin. Among those mentioned above, since the clogging resistance is excellent, as the resin, an urethane-based resin or a styrene-acrylic-based resin is preferable, and a styrene-acrylic-based resin is more preferable.

The urethane-based resin is not particularly limited as long as being a resin having an urethane bond in its molecule. As the urethane-based resin, for example, a polyether type urethane resin having an ether bond in its main chain besides an urethane bond, a polyester type urethane resin having an ester bond in its main chain besides an urethane bond, or a polycarbonate type urethane resin having a carbonate bond in its main chain besides an urethane bond may be mentioned. The urethane-based resin may be used alone, or at least two types thereof may be used in combination.

As the urethane-based resin, a commercially available product may also be used. As the commercially available product, for example, there may be mentioned Takelac (registered trademark) W6110 (trade name) manufactured by Mitsui Chemicals Inc.; Acrit (registered trademark) WBR-022U (trade name) manufactured by Taisei Fine Chemical Co., Ltd.; Permarin (registered trademark) UX-368T (trade name), Uprene (registered trademark) UXA-307 (trade name), or U-coat (registered trademark) UWS-145 (trade name) manufactured by Sanyo Chemical Industries, Ltd.; or Solsperse (registered trademark) 47000 (trade name) manufactured by The Lubrizol Corporation.

As the styrene-acrylic-based resin, for example, there may be mentioned a styrene-acrylic acid copolymer, a styrene-methacrylic acid copolymer, a styrene-methacrylic acid-acrylic acid ester copolymer, a styrene-a-methyl styrene-acrylic acid copolymer, or a styrene-a-methyl styrene-acrylic acid-acrylic acid ester copolymer. Those copolymers each may have any form selected from the group consisting of a random copolymer, a block copolymer, an alternate copolymer, and a graft copolymer.

As the styrene-acrylic-based resin, a commercially available product may also be used. As the commercially available product, for example, there may be mentioned Joncryl (registered trademark) 67 (trade name) manufactured by BASF Japan, or Solsperse (registered trademark) 43000 (trade name) manufactured by The Lubrizol Corporation.

In order to more effectively and reliably obtain the operational effect of this embodiment, a content of the dispersant with respect to the total mass of the ink composition is preferably 3.0 to 8.0 percent by mass.

2.4. Surfactant

The ink composition may also contain a surfactant.

As the surfactant, for example, an acetylene glycol-based surfactant, a fluorine-based surfactant, or a silicone-based surfactant may be mentioned. The surfactant may be used alone, or at least two types thereof may be used in combination.

As the acetylene glycol-based surfactant, for example, there may be mentioned 2,4,7,9-tetramethyl-5-decyne-4,7-diol, an alkylene oxide adduct thereof, 2,4-dimethyl-5-decyne-4-ol, or an alkylene oxide adduct thereof.

As the acetylene glycol-based surfactant, a commercially available product may also be used. As the commercially available product, for example, there may be mentioned Olfine (registered trademark) 104 Series (trade name) or E Series (trade name) manufactured by Nisshin Chemical Industry Co., Ltd., or Surfynol (registered trademark) Series (trade name) manufactured by Air Products & Chemicals Inc.

As the fluorine-based surfactant, for example, there may be mentioned a perfluoroalkyl sulfonic acid salt, a perfluoroalkyl carboxylic acid salt, a perfluoroalkyl phosphate ester, a perfluoroalkyl ethylene oxide adduct, a perfluoroalkyl betaine, or a perfluoroalkyl amine oxide compound.

As the fluorine-based surfactant, a commercially available product may also be used. As the commercially available product, for example, S-144 (trade name) or S-145 (trade name) manufactured by Asahi Glass Co., Ltd. may be mentioned.

As the silicone-based surfactant, for example, a polysiloxane-based compound or a polyether modified organosiloxane may be mentioned.

As the silicon-based surfactant, a commercially available product may also be used. As the commercially available product, for example, there may be mentioned 306, 307, 333, 341, 345, 346, 347, 348, or 349 (trade name) of BYK (registered trademark) Series manufactured by BYK Japan KK.

In order to more effectively and reliably obtain the operational effect of this embodiment, a content of the surfactant with respect to the total mass of the ink composition is preferably 0.5 to 5.0 percent by mass.

2.5. Water-Soluble Organic Solvent

The ink composition may also contain a water-soluble organic solvent.

As the water-soluble organic solvent, for example, there may be mentioned glycerin; a glycol, such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, or 1,6-hexanediol; a glycol monoether, such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, or methyl triglycol; a nitrogen-containing solvent, such as 2-pyrrolidone, N-methyl-2-pyrrolidone, or N-ethyl-2-pyrrolidone; or an alcohol, such as methanol, ethanol, n-propyl alcohol, iso-propyl alcohol, n-butanol, 2-butanol, tert-butanol, iso-butanol, n-pentanol, 2-pentanol, 3-pentanol, or tert-pentanol.

The water-soluble organic solvent may be used alone, or at least two types thereof may be used in combination.

In order to more effectively and reliably obtain the operational effect of this embodiment, a content of the water-soluble organic solvent with respect to the total mass of the ink composition is preferably 5 to 30 percent by mass.

2.6. Other Components

The ink composition may also contain various types of additives, such as a solubilizing agent, a viscosity adjuster, a pH adjuster, an antioxidant, an antiseptic agent, a fungicide, a corrosion inhibitor, and/or a chelating agent to trap metal ions influencing the dispersion.

The additives may be used alone, or at least two types thereof may be used in combination.

As the antiseptic agent, for example, sodium pentachlorophenol, 2-pyridinethiol-1-oxide sodium, or 1,2-dibenzine thiazoline-3-one may be mentioned.

As the antiseptic agent, a commercially available product may also be used. As the commercially available product, for example, there may be mentioned CRL, BND, GXL, XL-2, or TN (trade name) of Proxel (registered trademark)

Series manufactured by Lonza Japan Ltd. The antiseptic agent may be used alone, or at least two types thereof may be used in combination.

A content of each additive with respect to the total mass of the ink composition is 0.01 to 5.0 percent by mass.

2.7. Method for Manufacturing Ink Composition

The ink composition can be prepared such that after the dispersive dye and the water are mixed together with, if needed, other components in an arbitrary order, impurities, foreign materials, and the like are removed, if needed, by filtration or the like. As a mixing method of the components, there may be used a method in which after the components are sequentially charged in a container equipped with a stirring device, such as a mechanical stirrer or a magnetic stirrer, stirring and mixing are performed. As a filtration method, for example, a centrifugal filtration or a filter filtration may be mentioned.

In addition, in order to more preferably disperse the dispersive dye in the ink composition, a dye dispersant is prepared in advance, and the ink composition may be prepared using the dye dispersant instead of using the dispersive dye. The dye dispersant may be obtained such that after the dispersive dye, the water, and the dispersant are mixed together in an arbitrary order, the mixture thus obtained is dispersed by a paint shaker or the like.

3. Composition Set

A composition set includes the treatment liquid composition described above and the ink composition described above.

In this embodiment, the treatment liquid composition is adhered in advance to a cloth, so that the cloth to which the treatment liquid composition is adhered is obtained. In addition, on the cloth to which the treatment liquid composition is adhered, printing is performed with the ink composition, so that a printed matter having an excellent color development property and a preferable texture can be obtained.

4. Cloth

As the cloth according to this embodiment, for example, there may be mentioned natural fibers, such as cotton, hemp, wool, leather, or silk; synthetic fibers, such as a polypropylene, a polyester, an acetate, a triacetate, a polyamide, an acrylic, or a polyurethane; or biodegradable fibers, such as polylactic acid. In addition, as the cloth, blended fibers formed from those mentioned above may also be used.

Since a printed matter having a more excellent color development property and a more preferable texture can be obtained, the cloth preferably contains fibers having a hydroxy group, and cotton is more preferably used. As the fibers having a hydroxy group, blended fibers formed therefrom may also be used.

As the form of the cloth, for example, a woven cloth, a knitted cloth, a non-woven cloth, a fabric, a garment, and an accessory other than those mentioned above may be mentioned. As the garment and the accessory, for example, there may be mentioned sewn products, such as a T shirt, a handkerchief, a scarf, a towel, a handbag, and a cloth-made bag; furniture, such as a curtain, a sheet, a bed cover, and wallpaper; and fabrics before and after cutting to be used as materials to be sewn. As the forms of those materials mentioned above, for example, there may be mentioned a material having a long length in a roll shape, a material cut to have a predetermined size, and a material having a product shape. In addition, the cloth may be used as long as the treatment liquid composition is adhered thereto, and as the cloth, a cloth to which the treatment liquid composition is adhered in advance may also be used.

A weight per unit area of the cloth is preferably 1.0 to 10.0 Oz. When the weight per unit area of the cloth is in the range described above, preferable recording can be performed.

As the cloth, a cloth colored in advance with a dye may also be used. Since the treatment liquid composition is not likely to generate treatment traces, a cloth colored in advance can be even used. That is, even if the cloth is colored in advance, since the printing can be performed so as to suppress the generation of treatment traces, the quality and the commercial value of the printed matter as the product can be increased as compared to those in the past.

As the dye to color the cloth in advance, for example, there may be mentioned a water-soluble dye, such as an acidic dye or a basic dye; a dispersive dye to be used in combination with a dispersant; a reactive dye; or a solvent dye. When a cotton cloth is used as the cloth, a dispersive dye or a reactive dye suitable for cotton dyeing is preferably used, and a dispersive dye is more preferable.

5. Printing Method

A printing method of this embodiment includes a treatment liquid composition adhesion step of adhering the treatment liquid composition to the cloth.

By the step described above, the cloth to which the treatment liquid composition is adhered can be obtained. In addition, since the ink composition is adhered to the cloth as described above, a printed matter having an excellent color development property and a preferable texture can be obtained.

After the above treatment liquid composition adhesion step is performed, the printing method preferably includes an ink composition adhesion step of adhering an ink composition to the cloth to which the treatment liquid composition is adhered. In addition, the ink composition to be adhered to the cloth is not particularly limited as long as containing a dispersive dye, and for example, the ink jet ink composition according to this embodiment may be used. In addition, as for the ink composition adhesion step, a printing method using an ink jet method which will be described later may be mentioned for reference.

The printing method can be performed on various types of cloths, and a preferable printing can be performed.

An adhesion amount of the treatment liquid composition to the cloth is preferably set, for example, to 0.02 to 0.5 $g/cm^2$ and more preferably set to 0.02 to 0.3 $g/cm^2$. Since the adhesion amount of the treatment liquid composition is set in the range described above, the treatment liquid composition can be more uniformly adhered to the cloth, aggregation irregularities of an image of the printed matter can be further suppressed, and the color development property can be improved.

As a method to adhere the treatment liquid composition to the cloth, for example, there may be mentioned an immersion coating method in which the cloth is immersed in the treatment liquid composition; a roller coating method in which the treatment liquid composition is coated by a mangle roller machine, a roll coater, or the like; a spray coating method in which the treatment liquid composition is sprayed by a spray device or the like; or an ink jet coating method in which the treatment liquid composition is sprayed by an ink jet method. In order to adhere the treatment liquid composition to the cloth, one of the coating methods described above may be used alone, or at least two of the methods described above may be used in combination.

In this embodiment, since the degree of design freedom of the adhesion amount of the treatment liquid composition is increased, defects are not likely to be generated in the adhesion, and the treatment liquid composition can be uniformly adhered to the cloth, the treatment liquid composition is preferably adhered to the cloth using a roller machine, such as a mangle roller machine or a roll coater.

After the treatment liquid composition adhesion step in which the treatment liquid composition is adhered to the cloth, the printing method preferably includes a treatment liquid composition drying step of drying the treatment liquid composition adhered to the cloth. For the drying of the treatment liquid composition, although spontaneous drying may be performed, in order to increase the adhesion amount of the treatment liquid composition to the cloth and to improve a drying rate, the drying is preferably performed with heating.

A heating temperature is preferably set, for example, to 180° C. or less. Accordingly, even when the cloth is colored in advance with a dye, the sublimation of the dye by heat drying is suppressed, and discoloration of an original color of the cloth can also be suppressed. In addition, a lower limit of the heating temperature may be set so that a medium, such as moisture, contained in the treatment liquid composition is evaporated and is preferably set, for example, to 100° C. or more.

As a heating method, for example, a heat press method, a normal pressure steam method, a high pressure steam method, or a thermofix method may be mentioned. In addition, as a heat source of the heating, for example, infrared rays (lamp) may be mentioned.

After the treatment liquid composition is adhered to the cloth, the printing method may include, if needed, a washing step. Since the printing method includes the step described above, components which are contained in the treatment liquid composition and which are not adhered to the cloth can be removed.

6. Ink Jet Printing Method

An ink jet printing method is a method to adhere the ink composition to the cloth to which the treatment liquid composition is adhered by an ink jet method. By using the ink jet method, a dyed section having a fine pattern can also be easily and reliably formed. In addition, this method can be applied to various types of cloths, and a preferable printing can be performed. By the ink jet printing method, even on a cloth having a certain thickness, a preferable printing having a small color difference between a front and a rear side can be performed. As the ink jet printing method, for example, an indirect printing recording method or a direct printing recording method may be mentioned.

6.1. Ink Jet Recording Apparatus

An ink jet recording apparatus used for the printing method is not particularly limited, and any apparatus may be used as long as the apparatus at least includes an ink container to receive the ink composition and a recording head connected thereto and ejects the ink composition from the recording head to form an image on the cloth to which the treatment liquid composition is adhered or on transfer paper functioning as an intermediate transfer medium. In addition, as the ink jet recording apparatus, either a serial type or a line type may be used. In both the types of ink jet recording apparatuses, a recording head is mounted, and while a relative positional relationship between the recording head and the cloth or the transfer paper is changed, a predetermined volume of liquid droplets of the ink composition is intermittently ejected at a predetermined timing from nozzle holes of the recording head. Accordingly, the ink composition is adhered to the cloth or to the transfer paper, so that a predetermined image or a predetermined transfer image can be formed, respectively.

In general, in a serial type ink jet recording apparatus, a transport direction of a recording medium and a direction of reciprocal movement of the recording head are intersected to each other, and by the combination of the reciprocal movement of the recording head and the transport movement of the recording medium, the relative positional relationship between the recording medium and the recording head is changed. In addition, in the case described above, in general, a plurality of nozzle holes is disposed in the recording head, and along the transport direction of the recording medium, at least one line of the nozzle holes, that is, at least one nozzle line, is formed. In addition, in accordance with the types and the number of the ink compositions, a plurality of nozzle lines may be formed in the recording head in some cases.

In addition, in general, in a line type ink jet recording apparatus, the recording head performs no reciprocal movement, and the relative positional relationship between a recording medium and the recording head is changed by the transport of the recording medium. In the case described above, in general, a plurality of nozzle holes is also disposed in the recording head, and at least one nozzle line is formed along a direction intersecting the transport direction of the recording medium.

6.2. Indirect Printing Recording Method

An ink jet printing method of this embodiment includes a treatment liquid composition adhesion step of adhering the treatment liquid composition to the cloth, an ejection step of ejecting the ink composition from a recording head so as to be adhered to an intermediate transfer medium; and a transfer step of transferring the ink composition adhered to the intermediate transfer medium to the cloth to which the treatment liquid composition is adhered, the cloth being obtained in the treatment liquid composition adhesion step. In particular, by this printing method, the ink composition containing a dispersive dye, such as a sublimation dye, is ejected by a liquid ejecting head functioning as the recording head so as to be adhered to the intermediate transfer medium, and heating is then performed while a surface of the intermediate transfer medium to which the ink composition is adhered faces a cloth surface to which the treatment liquid composition is adhered so that the dispersive dye contained in the ink composition is transferred to the cloth to which the treatment liquid composition is adhered. In this embodiment, the printing method as described above is also called an indirect printing recording method in some cases. According to this printing method, a preferable printing can be performed without any restriction of the cloth form.

6.2.1. Treatment Liquid Composition Adhesion Step

As for the treatment liquid composition adhesion step, the printing method described above may be mentioned for reference.

6.2.2. Ejection Step

In the ejection step, a heated ink composition is ejected from the liquid ejecting head so as to be adhered to the intermediate transfer medium. In particular, a pressure generating device is driven, and the ink composition filled in a pressure generating chamber of the liquid ejecting head is ejected from the nozzle.

As the intermediate transfer medium, for example, paper, such as regular paper, or a recording medium including an ink receiving layer may be used. The recording medium including an ink receiving layer described above may be called, for example, ink jet exclusive paper or coated paper. Among those mentioned above, paper including an ink receiving layer which contains inorganic particles, such as silica, is more preferable. Accordingly, in a process in which the ink composition applied to the intermediate transfer medium is dried, an intermediate recorded matter in which, for example, bleeding on a recording surface is suppressed can be obtained. In addition, according to the medium as described above, the dispersive dye is more likely to stay on the recording surface, and in the following transfer step, the sublimation of the dispersive dye can be more efficiently performed.

In this step, at least two types of ink compositions may be used. Accordingly, for example, a color gamut to be exhibited can be further increased. One of the at least two types of ink compositions described above may be the ink composition of this embodiment, and at least two types thereof each may be the ink composition of this embodiment.

6.2.3. Transfer Step

The transfer step is a step in which heating is performed such that while the surface of the intermediate transfer medium to which the ink composition is adhered faces the cloth surface to which the treatment liquid composition is adhered, the dispersive dye contained in the ink composition is transferred to the cloth to which the treatment liquid composition is adhered. Accordingly, the dispersive dye is transferred, and a printed matter which is the cloth to which the ink composition is adhered is obtained.

In this step, the heating may be performed while the intermediate transfer medium to which the ink composition is adhered faces the cloth to which the treatment liquid composition is adhered. In this step, the heating is more preferably performed while the intermediate transfer medium is in close contact with the cloth to which the treatment liquid composition is adhered. Accordingly, for example, a clearer image is recorded on the cloth to which the treatment liquid composition is adhered, that is, dyeing can be performed.

As a heating method, for example, a steaming method using vapor, a heat press method by dry heating, a thermosol method, an HT steamer method by a superheated vapor, or an HP steamer method by a pressurized vapor may be mentioned. On the cloth to which the ink composition is adhered, a heating treatment may be performed immediately or after a predetermined time passes. Since a printed matter having, besides excellent rubbing fastness, washing fastness, and color development property, a preferable texture can be obtained, as the heating method, dry heating is preferable.

A heating temperature is preferably 160° C. to 220° C. and more preferably 190° C. to 210° C. Since the heating temperature is in the range described above, energy required for the transfer can be further reduced, and the productivity of the printed matter tends to be made more excellent. In addition, the color development property of the printed matter tends to be made more excellent.

Although depending on the heating temperature, a heating time is preferably 30 to 120 seconds and more preferably 40 to 90 seconds. Since the heating time is in the range described above, the energy required for the transfer can be further reduced, and the productivity of the printed matter tends to be made more excellent. In addition, the color development property of the printed matter tends to be made more excellent.

An adhesion amount of the ink composition per unit area of the cloth to be adhered to the cloth by the transfer is preferably 1.5 to 6.0 mg/cm$^2$. Since the adhesion amount of the ink composition is in the range described above, the color development property of an image or the like to be formed by the printing is improved, and in addition, since the drying property of the ink adhered to the cloth is secured, bleeding of the image or the like can be suppressed from being generated.

6.2.4. Other Steps

This method may also include, if needed, an intermediate treatment step and a post-treatment step.

As the intermediate treatment step, for example, a step of preliminarily heating the cloth to which the treatment liquid composition is adhered may be mentioned.

As the post-treatment step, for example, a step of washing the printed matter may be mentioned.

6.3. Direct Printing Recording Method

An ink jet printing method of this embodiment may include a treatment liquid composition adhesion step of adhering the treatment liquid composition to the cloth and an ink composition adhesion step of ejecting the ink composition from a recording head so as to be adhered to the cloth to which the treatment liquid composition is adhered, the cloth being obtained in the treatment liquid composition adhesion step. In this embodiment, the printing method as described above is also called a direct printing recording method. According to this printing method, a dyed section having a fine pattern can also be easily and reliably formed. In addition, since a printing plate, such as the intermediate transfer medium, is not required to be used, on-demand characteristics are excellent, and small quantity production and multi-product production can be preferably performed.

6.3.1. Step of Obtaining Cloth to which Treatment Liquid Composition is Adhered

As for the treatment liquid composition adhesion step, the printing method described above may be mentioned for reference.

6.3.2. Ink Composition Adhesion Step

In the ink composition adhesion step, the ink composition is adhered to the cloth to which the treatment liquid composition is adhered. In addition, in the ink composition adhesion step, a step of further adhering the ink composition on a region to which the ink composition is adhered may also be included.

In the ink composition adhesion step, a maximum adhesion amount to the cloth is preferably 50 to 200 mg/cm$^2$ and more preferably 80 to 150 mg/cm$^2$. When the maximum adhesion amount is in the range described above, the color development property is made more preferable. In addition, rubbing fastness of an image is also made excellent, and aggregation irregularities tend to be less noticeable.

In this step, when the ink composition is adhered to the cloth to which the treatment liquid composition is adhered, heating is preferably performed. Accordingly, for example, on the cloth to which the treatment liquid composition is adhered, a clearer image can be recorded, that is, dyeing can be performed.

As a heating method, for example, a heat press method, a normal pressure steam method, a high pressure steam method, or a thermofix method may be mentioned. In addition, as a heat source of the heating, for example, a hot wind, infrared rays, or microwaves may be mentioned.

In the heating, a surface temperature of the cloth thus heated is preferably 60° C. to 180° C. Since the surface temperature thereof is in the range described above, damage on the ink jet head and/or the cloth can be reduced, and in addition, the ink is likely to uniformly wet spread on and permeate in the cloth. In addition, the surface temperature may be measured using, for example, a non-contact thermometer (trade name: IT2-80, manufactured by Keyence Corporation).

A heating time is preferably set, for example, to five seconds to five minutes. Since the heating time is set in the range described above, while the damage on the ink jet head and/or the cloth is reduced, the cloth can be sufficiently heated.

6.3.3. Other Steps

The method described above may further include, if needed, an intermediate treatment step and a post-treatment step. As for the steps described above, the other steps of the indirect printing recording method described above may be mentioned for reference.

EXAMPLES

Hereinafter, the present disclosure will be described in more detail with reference to Examples and Comparative Examples. However, the present disclosure is not limited at all to the following Examples.

1. Synthesis of Polyester Resin

Polyester Resins A to I

First, a mixture containing a phthalic acid and a (poly)alkylene glycol was prepared so as to have one of the compositions shown in Table 1. This mixture was charged in an autoclave and then heated to 220° C. for 4 hours, so that an esterification reaction was performed. Next, after tetrabutyl titanate was charged as a catalyst in the autoclave, the temperature was increased to 230° C., and the pressure was gradually reduced to 13 Pa for 1.5 hours. After a polycondensation reaction was further continued for 4 hours under the conditions described above, the pressure in the autoclave was returned to normal pressure using a nitrogen gas, and the temperature therein was decreased to room temperature, so that polyester resins A to I were synthesized.

In addition, the numerical value of the amount of each component shown in Table 1 represents percent by mole. "Tg" represents a glass transition temperature (° C.) of the polyester resin. "ISOPHTHALIC ACID/TEREPHTHALIC ACID" represents a molar ratio of the content of the structural unit derived from isophthalic acid to the content of the structural unit derived from terephthalic acid in the polyester resin.

TABLE 1

| | | | PHTHALIC ACID (AROMATIC COMPOUND) | | | ALKYLENE GLYCOL (NON-AROMATIC COMPOUND) | | |
|---|---|---|---|---|---|---|---|---|
| | | Tg(° C.) | TEREPHTHALIC ACID (PERCENT BY MOLE) | ISOPHTHALIC ACID (PERCENT BY MOLE) | ISOPHTHALIC ACID/ TEREPHTHALIC ACID | ETHYLENE GLYCOL (PERCENT BY MOLE) | NEOPENTYL GLYCOL (PERCENT BY MOLE) | DIETHYLENE GLYCOL (PERCENT BY MOLE) |
| POLYESTER RESIN | A | 65 | 25 | 25 | 1.00 | 25 | 25 | |
| | B | 18 | 45 | 11 | 0.24 | 22 | 22 | |
| | C | 20 | | 50 | | | | 50 |
| | D | 67 | 26 | 24 | 0.92 | 22 | 28 | |
| | E | 30 | 15 | | | 85 | | |
| | F | 78 | 85 | | | 15 | | |
| | G | 25 | 5 | | | 95 | | |
| | H | 80 | 95 | | | 5 | | |
| | I | 70 | 16 | 34 | 2.13 | 25 | 25 | |

2. Preparation of Dye Printing Treatment Liquid Composition

Examples 1 to 11, and Comparative Examples 1 to 5

After components were charged in a mixing tank so as to obtain one of the compositions shown in Tables 2 and 3, mixing and stirring were performed, and filtration using a 5-μm membrane filter was further performed, so that each treatment liquid composition was obtained. In addition, in Comparative Example 1, the treatment liquid composition was not prepared.

The numerical value of the amount of each of the components shown in Tables 2 and 3 represents percent by mass. The amount of the cross-linking agent represents the amount (percent by mass) calculated on a solid content basis.

In addition, the components shown in Tables 2 and 3 are as shown below.
Polyester Resin
  A to I: polyester resins A to I each obtained by the above synthesis.
Acid or Glycol
  Malic acid
  PEG400: PEG #400 (trade name, manufactured by Lion Corporation, polyethylene glycol)
Cross-Linking Agent
  WS-500: Epocros (registered trademark) WS-500 (trade name, manufactured by Nippon Shokubai Co., Ltd., oxazoline group-containing compound, solid content: 39 percent by mass)
  #220: Fixer #220 (trade name, manufactured by Murayama Chemical Laboratory Co., Ltd., isocyanate group-containing compound having an isocyanurate skeleton in its structure, solid content: 40 percent by mass)

TABLE 2

| | | | EXAMPLE 1 | EXAMPLE 2 | EXAMPLE 3 | EXAMPLE 4 | EXAMPLE 5 | EXAMPLE 6 |
|---|---|---|---|---|---|---|---|---|
| TREATMENT LIQUID COMPOSITION (PERCENT | POLYESTER RESIN | A | 5 | | | | | |
| | | B | | 5 | | | | |
| | | C | | | 5 | | | |
| | | D | | | | 5 | | |

TABLE 2-continued

| BY MASS) | | | | | | | | |
|---|---|---|---|---|---|---|---|---|
| | | E | | | | | 5 | |
| | | F | | | | | | 5 |
| | | G | | | | | | |
| | | H | | | | | | |
| | | I | | | | | | |
| ACID OR GLYCOL | MALIC ACID | | | | | | | |
| | PEG400 | | | | | | | |
| CROSS-LINKING AGENT | WS-500 #220 | | | | | | | |
| PURE WATER | | | BALANCE | BALANCE | BALANCE | BALANCE | BALANCE | BALANCE |
| TOTAL | | | 100 | 100 | 100 | 100 | 100 | 100 |

| | | | EXAMPLE 7 | EXAMPLE 8 | EXAMPLE 9 | EXAMPLE 10 | EXAMPLE 11 |
|---|---|---|---|---|---|---|---|
| TREATMENT LIQUID COMPOSITION (PERCENT BY MASS) | POLYESTER RESIN | A | 5 | 5 | 10 | 1 | |
| | | B | | | | | |
| | | C | | | | | |
| | | D | | | | | |
| | | E | | | | | |
| | | F | | | | | |
| | | G | | | | | |
| | | H | | | | | |
| | | I | | | | | 5 |
| ACID OR GLYCOL | MALIC ACID | | | | | | |
| | PEG400 | | | | | | |
| CROSS-LINKING AGENT | WS-500 #220 | | 2.5 | 2.5 | | | |
| PURE WATER | | | BALANCE | BALANCE | BALANCE | BALANCE | BALANCE |
| TOTAL | | | 100 | 100 | 100 | 100 | 100 |

TABLE 3

| | | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|
| TREATMENT LIQUID COMPOSITION (PERCENT BY MASS) | POLYESTER RESIN | A | NO PREPARATION OF TREATMENT LIQUID COMPOSITION | | | | |
| | | B | | | | | |
| | | C | | | | | |
| | | D | | | | | |
| | | E | | | | | |
| | | F | | | | | |
| | | G | | 5 | | | |
| | | H | | | 5 | | |
| | | I | | | | | |
| ACID OR GLYCOL | MALIC ACID | | | | | 5 | |
| | PEG400 | | | | | | 5 |
| CROSS-LINKING AGENT | WS-500 #220 | | | | | | |
| PURE WATER | | | | BALANCE | BALANCE | BALANCE | BALANCE |
| TOTAL | | | — | 100 | 100 | 100 | 100 |

3. Preparation of Ink Jet Ink Composition

Cyan Ink

After components were charged in a mixing tank to have one of the compositions shown in Table 4, mixing and stirring were performed for 2 hours. Subsequently, filtration was performed using a membrane filter having a pore diameter of 1 μm, so that a cyan ink (hereinafter, referred to as "C ink" in some cases) was obtained as the ink composition.

In addition, the numerical value of each of the components shown in Table 4 represents percent by mass. "C INK" represents a cyan ink.

In addition, the components shown in Table 4 are as shown below.

Dye Dispersant
    Disperse Blue 359: C.I. Disperse Blue 359 (commercial product)

Water-Soluble Organic Solvent
    Propylene glycol
    Glycerin
    Methyl triglycol Surfactant BYK(R)-348: BYK (registered trademark)-348 (trade name, silicone-based surfactant, manufactured by BYK Japan KK)

TABLE 4

| | | | C INK |
|---|---|---|---|
| INK JET INK COMPOSITION (PERCENT BY MASS) | DYE | Disperse Blue 359 | 5 |
| | DISPERSANT WATER-SOLUBLE ORGANIC SOLVENT | PROPYLENE GLYCOL | 5 |
| | | GLYCERIN | 10 |
| | | METHYL TRIGLYCOL | 5 |
| | SURFACTANT | BYK(R)-348 | 0.5 |
| | PURE WATER | | BALANCE |
| | TOTAL | | 100 |

4. Formation of Printed Matter

4.1. Formation of Cloth to which Treatment Liquid Composition is Adhered

Examples 1 to 11, and Comparative Examples 2 to 5

The treatment liquid composition of each of Examples 1 to 11 and Comparative Examples 2 to 5 was adhered to a cloth. In particular, the cloth to which the treatment liquid composition was adhered was obtained as described below.

A white cotton braid #4000 (trade name, manufactured by Toyobo Co., Ltd.) was immersed as the cloth in the treatment liquid composition, and the treatment liquid composition was applied to the cloth at a squeezing rate of 80% by a mangle roller machine. Subsequently, after the cloth thus treated was dried at 140° C. for 2 minutes, drying was further performed at 170° C. for 1 minute, so that the cloth to which the treatment liquid composition was adhered was obtained in each of Examples and Comparative Examples.

In addition, the squeezing rate (S) was calculated by the following equation (1).

$$S(\%)=[(A-B)/B]\times 100 \quad (1)$$

In addition, in the above equation (1), S represents the squeezing rate (%), A represents a mass of the cloth to which the treatment liquid composition is adhered, and B represents a mass of the cloth before the treatment liquid composition is adhered thereto.

4.2. Formation of Intermediate Recording Medium to which Ink Composition is Adhered Examples 1 to 11, and Comparative Examples 1 to 5

The C ink was filled in a cartridge of an ink jet printer PX-G930 (trade name, manufactured by Seiko Epson Corporation). Subsequently, on a coating layer of coated paper (TRANSJET Sportline 1254 (trade name), manufactured by Chem Paper) functioning as an intermediate transfer medium, the ink was adhered at a resolution of 720 dpi×720 dpi and an ink ejection amount of 12 mg/inch$^2$ at a duty of 100%, so that an image having a solid pattern was formed.

Accordingly, an intermediate recording medium to which the ink composition was adhered was obtained.

4.3. Printing

Examples 1 to 11, and Comparative Examples 2 to 5

The image formed on the surface of the intermediate recording medium to which the ink composition obtained described above was adhered was thermal transferred to the cloth (cotton braid) to which the treatment liquid composition obtained as described above was adhered at a temperature 200° C. and a pressure of 4.2 N/cm$^3$ for 60 seconds using a heat press machine TP-608M (trade name, manufactured by Taiyo Seiki Co., Ltd.), so that a printed matter which was the cloth to which the C ink was adhered was obtained in each of Examples and Comparative Examples.

Comparative Example 1

The image formed on the surface of the intermediate recording medium to which the ink composition obtained as described above was adhered was thermal transferred to a white cotton braid #4000 (trade name, manufactured by Toyobo Co., Ltd.) used as the cloth at a temperature 200° C. and a pressure of 4.2 N/cm$^3$ for 60 seconds using a heat press machine TP-608M (trade name, manufactured by Taiyo Seiki Co., Ltd.), so that a printed matter which was the cloth to which the C ink was adhered was obtained.

5. Evaluation of Printed Matter

5.1. Color Development Property

The printed matter of each of Examples 1 to 11 and Comparative Examples 1 to 5 obtained by the printing described above was left at a room temperature of 25° C. for three days. Subsequently, a color density (OD value) of the C ink of the printed matter thus left was measured at a room temperature of 25° C. under the following measurement conditions using a fluorescence spectrodensitometer FD-7 (trade name, manufactured by Konica Minolta, Inc.).

Measurement Conditions
  Observation light source: D65
  Observation field: 2°
  Status: T
  Polarizing filter: not mounted Subsequently, the OD value of the printed matter of each of Examples 1 to 11 and Comparative Examples 2 to 5 was compared with the OD value of the printed matter of Comparative Example 1, and the color development property of the C ink was evaluated in accordance with the following evaluation criteria. The results are shown in Tables 5 and 6.

Evaluation Criteria
  AA: OD value is 220% or more as compared with OD value of printed matter of Comparative Example 1.
  A: OD value is 150% to less than 220% as compared with OD value of printed matter of Comparative Example 1.
  B: OD value is 100% to less than 150% as compared with OD value of printed matter of Comparative Example 1.
  C: OD value is less than 100% as compared with OD value of printed matter of Comparative Example 1.

5.2. Texture

The texture of the printed matter of each of Examples 1 to 11 and Comparative Examples 1 to 5 obtained by the above printing was evaluated by a sensory test. In particular, judges performed a sensory evaluation of the printed matter thus obtained in accordance with the following evaluation criteria, and the texture was evaluated. The results are shown in Tables 5 and 6.
- A: Printed matter is soft and has no stiff touch.
- B: Printed matter is slightly hard and has slightly stiff touch.
- C: Printed matter is hard and has apparent stiff touch.

5.3. Abrasion Resistance

The printed matter of each of Examples 1 to 11 and Comparative Examples 1 to 5 obtained by the printing described above was left at a room temperature of 25° C. for one hour. Subsequently, an abrasion resistance test was performed on a recorded surface of the printed matter in accordance with JIS K5701: 2000 using a Gakushin-type rubbing fastness tester AB-301 (trade name, manufactured by Tester Sangyo Co., Ltd.), and the abrasion resistance was evaluated. In particular, after a cotton cloth was placed on the recorded surface, and rubbing was then performed 20 times with a load of 200 g, peeling of the recorded surface and ink transfer to the cotton cloth were confirmed by visual inspection, and the abrasion resistance was evaluated in accordance with the following evaluation criteria. The results are shown in Tables 5 and 6.
Evaluation Criteria
- A: Neither color transfer nor peeling is observed.
- B: Color transfer and peeling are slightly observed.
- C: Color transfer and peeling are apparently observed.

5.4. Washing Fastness

A washing fastness test was performed on the printed matter of each of Examples 1 to 11 and Comparative Examples 1 to 5 obtained by the printing described above in accordance with JIS L0844 (Test methods for colour fastness to washing and laundering) A-2 method. In particular, the printed matter of each of Examples 1 to 11 and Comparative Examples 1 to 5 obtained by the printing described above was washed, rinsed, dehydrated, and dried using a general household laundry detergent (fluorescent whitener free) by a household washing machine (ZABOON (trade name), manufactured by Toshiba Corporation), and the discoloration of the printed matter was evaluated. The degree of discoloration was evaluated by the following evaluation criteria in accordance with the discoloration gray scale of JIS L0804: 2004 (ISO 105-C10(B2)). The results are shown in Tables 5 and 6.
Evaluation Criteria
- A: Washing fastness is 3 grade or higher.
- B: Washing fastness is 2 grade to lower than 3 grade.
- C: Washing fastness is lower than 2 grade.

5.5. Discoloration Resistance

The printed matter of each of Examples 1 to 11 and Comparative Examples 1 to 5 obtained by the printing described above was left at a room temperature of 25° C. for one hour. Subsequently, a color density (OD value) of the C ink of the printed matter thus left was measured at a room temperature of 25° C. under the following conditions using a fluorescence spectrodensitometer FD-7 (trade name, manufactured by Konica Minolta, Inc.). Subsequently, the printed matter described above was left at room temperature of 25° C. for three days, and a color density (OD value) of the printed matter thus left was measured under the conditions similar to those described above.
Measurement Conditions
- Observation light source: D65
- Observation field: 2°
- Status: T
- Polarizing filter: not mounted The OD value of the printed matter immediately after the printing and the OD value of the printed matter after being left for three days were compared with each other, and the discoloration resistance of the printed matter of each of Examples 1 to 11 and Comparative Examples 1 to 5 was evaluated in accordance with the following evaluation criteria. The results are shown in Tables 5 and 6.
Evaluation Criteria
- A: Rate of change in OD value is less than 5%.
- B: Rate of change in OD value is 5% to less than 10%.
- C: Rate of change in OD value is 10% or more.

TABLE 5

|  |  | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 |
|---|---|---|---|---|---|---|---|---|---|---|---|---|
| EVALUATION RESULT | COLOR DEVELOPMENT PROPERTY | A | B | A | A | B | A | A | AA | A | B | AA |
|  | TEXTURE | A | A | A | B | A | B | B | A | B | A | A |
|  | ABRASION RESISTANCE | B | B | B | B | B | B | A | A | A | B | B |
|  | WASHING FASTNESS | A | A | B | B | B | B | B | A | A | B | A |
|  | DISCOLORATION RESISTANCE | A | C | B | A | B | A | A | A | A | A | A |

TABLE 6

|  |  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|
| EVALUATION RESULT | COLOR DEVELOPMENT PROPERTY | C | C | A | C | C |
|  | TEXTURE | A | A | C | A | A |
|  | ABRASION RESISTANCE | C | C | C | C | C |
|  | WASHING FASTNESS | C | C | C | C | C |
|  | DISCOLORATION RESISTANCE | A | C | C | C | B |

As shown in Tables 5 and 6, it was found that when the treatment liquid composition of this embodiment is adhered to the cloth, and printing is performed on the cloth to which the treatment liquid composition is adhered, a printed matter having an excellent color development property and a preferable texture can be obtained.

From the comparison between Examples 1, 4, and 6 and Comparative Examples 2, 3, and 5, it was found that when a polyester resin having a glass transition temperature of 50° C. or more is used, a printed matter having a more excellent discoloration resistance can be obtained.

From the comparison between Examples 1, 4, and 11 and Comparative Example 2, it was found that when a polyester resin in which the molar ratio of the content of the structural unit derived from isophthalic acid to the content of the structural unit derived from terephthalic acid is in a range of 0.5 to 3.0 is used, a printed matter having more excellent color development property and discoloration resistance can be obtained.

From the comparison between Examples 7 and 8 and Comparative Example 1, it was found that when the cross-linking agent is used, a printed matter having more excellent color development property and abrasion resistance can be obtained.

What is claimed is:

1. A dye printing treatment liquid composition which is used to be adhered to a cloth, the treatment liquid composition comprising:
    a polyester resin; and
    water,
    wherein the polyester resin includes a structural unit derived from an aromatic compound and a structural unit derived from a non-aromatic compound,
    the aromatic compound includes a phthalic acid,
    the non-aromatic compound includes a (poly)alkylene glycol,
    a content of a structural unit derived from the phthalic acid with respect to 100 percent by mole of the polyester resin is 15 to 85 percent by mole, and
    a content of a structural unit derived from the (poly) alkylene glycol with respect to 100 percent by mole of the polyester resin is 15 to 85 percent by mole.

2. The dye printing treatment liquid composition according to claim 1,
    wherein the (poly)alkylene glycol is at least one selected from the group consisting of ethylene glycol, neopentyl glycol, and diethylene glycol.

3. The dye printing treatment liquid composition according to claim 1,
    wherein the polyester resin has a glass transition temperature of 50° C. or more.

4. The dye printing treatment liquid composition according to claim 1,
    wherein the cloth contains fibers having a hydroxy group.

5. The dye printing treatment liquid composition according to claim 1,
    wherein the structural unit derived from the phthalic acid includes a structural unit derived from terephthalic acid and a structural unit derived from isophthalic acid, and
    a molar ratio of a content of the structural unit derived from isophthalic acid to a content of the structural unit derived from terephthalic acid is 0.5 to 3.0.

6. The dye printing treatment liquid composition according to claim 1, further comprising a cross-linking agent.

7. The dye printing treatment liquid composition according to claim 6,
    wherein the cross-linking agent includes an isocyanate group-containing compound having an isocyanurate skeleton in its structure.

8. The dye printing treatment liquid composition according to claim 1,
    wherein a content of the polyester resin with respect to a total mass of the treatment liquid composition is 0.05 to 20 percent by mass.

9. The dye printing treatment liquid composition according to claim 1,
    wherein before the cloth is dye-printed, the dye printing treatment liquid composition is used to be adhered to the cloth.

10. A composition set comprising:
    the dye printing treatment liquid composition according to claim 1; and
    an ink jet ink composition,
    wherein the ink jet ink composition contains a dispersive dye and water.

11. A printing method comprising:
    a treatment liquid composition adhesion step of adhering the dye printing treatment liquid composition according to claim 1 to a cloth.

12. An ink jet printing method comprising:
    a treatment liquid composition adhesion step of adhering the dye printing treatment liquid composition included in the composition set according to claim 10 to a cloth;
    an ejection step of ejecting the ink jet ink composition included in the composition set according to claim 10 from a recording head so as to be adhered to an intermediate transfer medium; and
    a transfer step of transferring the ink jet ink composition adhered to the intermediate transfer medium to the cloth to which the dye printing treatment liquid composition is adhered.

* * * * *